US008615972B2

(12) United States Patent

Bassani et al.

(10) Patent No.: US 8,615,972 B2

(45) Date of Patent: Dec. 31, 2013

(54) TORQUE MEASURING ASSEMBLY SUITABLE FOR USE IN A CONTAINER CAPPING MACHINE

(75) Inventors: Loris Bassani, Montreal (CA); Daniel Vaillancourt, Repentigny (CA)

(73) Assignee: Capmatic Ltd., Montreal (CA)

( * ) Notice: Subject to any disclaimer, the term of this patent is extended or adjusted under 35 U.S.C. 154(b) by 806 days.

(21) Appl. No.: 12/342,923

(22) Filed: Dec. 23, 2008

(65) Prior Publication Data

US 2010/0115888 A1 May 13, 2010

Related U.S. Application Data

(60) Provisional application No. 61/112,511, filed on Nov. 7, 2008.

(51) Int. Cl.

*B67B 3/20* (2006.01)
*B67B 3/26* (2006.01)
*G01L 5/24* (2006.01)

(52) U.S. Cl.

USPC .................... 53/490; 53/53; 53/75; 53/331.5; 73/862.21; 73/862.23

(58) Field of Classification Search

CPC ...... B67B 3/261; G01L 5/0042; B65B 7/2835
USPC .............. 53/396, 490, 53, 75, 76, 317, 331.5; 73/862.21, 862.23, 862.27, 862.325, 73/862.338
IPC ................................................. B67B 3/20, 3/26
See application file for complete search history.

(56) References Cited

U.S. PATENT DOCUMENTS

| | | | | | |
|---|---|---|---|---|---|
| 4,457,420 | A | * | 7/1984 | Ducloux | 198/370.07 |
| 4,511,044 | A | * | 4/1985 | Connor et al. | 209/522 |
| 4,674,340 | A | * | 6/1987 | Burt et al. | 73/862.23 |
| 4,696,144 | A | * | 9/1987 | Bankuty et al. | 53/331.5 |
| 4,716,772 | A | * | 1/1988 | Bubeck et al. | 73/862.23 |
| 4,738,347 | A | * | 4/1988 | Brouwer et al. | 198/370.02 |
| 4,794,801 | A | * | 1/1989 | Andrews et al. | 73/862.23 |
| 4,907,700 | A | * | 3/1990 | Bankuty et al. | 209/546 |
| 6,023,910 | A | | 2/2000 | Lubus et al. | |
| 6,105,343 | A | * | 8/2000 | Grove et al. | 53/490 |
| 6,494,017 | B1 | * | 12/2002 | McGrath et al. | 53/53 |
| 7,320,254 | B1 | * | 1/2008 | Martin | 73/862.21 |
| 7,325,369 | B2 | | 2/2008 | Jalbert | |
| 2007/0095018 | A1 | * | 5/2007 | Perazzo et al. | 53/317 |
| 2009/0293437 | A1 | * | 12/2009 | Schulz et al. | 53/490 |

FOREIGN PATENT DOCUMENTS

| | | | | | |
|---|---|---|---|---|---|
| JP | 55129717 | A | * | 10/1980 | G01L 5/00 |
| JP | 02219784 | A | * | 9/1990 | B67B 3/26 |
| JP | 08133393 | A | * | 5/1996 | B67B 3/26 |
| JP | 09249293 | A | * | 9/1997 | B67B 3/20 |
| JP | 2003081387 | A | * | 3/2003 | B67B 3/20 |

* cited by examiner

*Primary Examiner* — Stephen F Gerrity

(74) *Attorney, Agent, or Firm* — Cesari and McKenna, LLP; Patricia A. Sheehan

(57) ABSTRACT

The present invention provides a torque measuring station, comprising a cap-engaging assembly for engaging a cap that has been secured onto a container, a torque measuring assembly for obtaining a measurement indicative of the torque exerted on the cap by the cap engaging assembly and a processing entity in communication with the torque measuring assembly. The processing entity is operative for receiving the measurement indicative of the torque, and for causing the container to be handled, once released from said cap-engaging assembly, on the basis of the measurement indicative of the torque applied to the cap.

26 Claims, 10 Drawing Sheets

TORQUE MEASURING ASSEMBLY SUITABLE FOR USE IN A CONTAINER CAPPING MACHINE

CROSS-REFERENCE TO RELATED APPLICATIONS

This application claims the benefit under 35 USC 119(e) of U.S. Provisional Patent Application 61/112,511 filed on Nov. 7, 2008 and hereby incorporated by reference herein.

FIELD OF THE INVENTION

The present invention relates to torque measuring assemblies, and specifically to torque measuring assemblies suitable for ensuring that an acceptable amount of torque has been applied to a cap that has been secured to a container.

BACKGROUND OF THE INVENTION

Container capping machines for rotating caps onto containers are known in the art. Typically, container capping machines use discs or belts for rotating the caps in relation to the containers such that the caps are screwed onto the necks of the containers. In this manner, caps that have been loosely placed onto the necks of containers are rotated until they are tightly secured to the container.

In many industries, such as in the pharmaceutical industry, it is important that the caps are screwed onto the containers tightly, so as to prevent unwanted opening of the container which could lead to tampering or contamination of the contents of the containers. As such, there are requirements surrounding the minimum amount of torque that should be applied to the caps, in order to ensure that the caps are securely tightened onto the containers. In order to comply with these requirements, container capping machines must ensure that they apply at least the minimum required amount of torque to the caps. If the cap is not screwed onto the container tightly enough, then the container does not meet the imposed requirements and the container needs to be removed from the production line.

In light of this minimum torque requirement, it is common for container capping machines to include load cells that are in communication with the capping disks and/or belts for measuring the amount of torque that is applied to the caps as they are being secured onto the containers. An example of this type of arrangement is described in U.S. Pat. No. 7,325,369 to Luc Jalbert. However, a deficiency with this type of arrangement is that the load cell is coupled directly to the brake of one of the tightening belts. As such, if the capping arrangement is defective for any reason, the load cell will provide a faulty reading which could lead to caps that do not meet the minimum torque requirement being kept in the production line, and eventually making their way into consumer's hands.

In light of the above, there is a need in the industry for an improved container capping machine that alleviates, at least in part, the deficiencies of existing container capping machines.

SUMMARY OF THE INVENTION

In accordance with a first broad aspect, the present invention provides a torque measuring station, comprising a cap-engaging assembly for engaging a cap that has been secured onto a container, a torque measuring assembly for obtaining a measurement indicative of the torque exerted on the cap by the cap engaging assembly and a processing entity in communication with the torque measuring assembly. The processing entity is operative for receiving the measurement indicative of the torque, and for causing the container to be handled, once released from said torque measuring station, on the basis of the measurement indicative of the torque applied to the cap.

In accordance with a second broad aspect, the present invention provides a method comprising engaging, at a cap-engaging assembly, a cap that has been secured onto a container, applying, via the cap-engaging assembly, a torque to the cap and obtaining a measurement indicative of the torque applied to the cap by the cap-engaging assembly. The method further comprises causing the container to be handled, once released from the cap-engaging assembly, on the basis of the measurement indicative of the torque applied to the cap.

In accordance with a third broad aspect, the present invention provides a torque measuring station. The torque measuring station comprises a cap-engaging assembly for sequentially engaging caps that have been secured onto respective containers, a torque measuring assembly operative for obtaining measurements indicative of the torque exerted on each of the sequentially engaged caps by the cap engaging assembly and a processing entity in communication with the torque measuring assembly for receiving the measurements indicative of the torque applied to each of the sequentially engaged caps. The processing entity is further operative for generating statistical data, at least in part on the basis of the measurements of the torque applied to each of the sequentially engaged caps.

In accordance with a fourth broad aspect, the present invention provides a container capping system, comprising a cap applying station operative for engaging a cap positioned on a container for applying a torque to the cap for securing the cap onto the container. The container capping system further comprising a torque measuring station located subsequent to the cap applying station. The torque measuring station being operative for engaging the cap for applying a torque to the cap in a direction tending to unscrew the cap from the container. The torque measuring station being operative for determining whether the cap reaches a predetermined torque value before starting to unscrew from the container.

In accordance with a fifth broad aspect, the present invention provides a container capping machine that comprises at least one container gripping belt for supporting a container moving through the container capping machine, at least one pair of cap engaging belts for applying a torque to a cap that has been placed on the container and at least one in-feed belt positioned prior to the at least one container gripping belt. The at least one in-feed belt is operative for supplying containers to the at least one container gripping belt. The container capping machine further comprises a processing entity for controlling the at least one in-feed belt independently of the at least one container gripping belt such that the at least one in-feed belt is activated and deactivated independently of the at least one container gripping belt.

In accordance with a fifth broad aspect, the present invention provides a method for controlling a supply of containers to a container capping machine. The container capping machine comprises at least one container gripping device for guiding a container through the container capping machine, and at least one in-feed device positioned prior to the at least one container gripping device for supplying containers to the at least one container gripping device. When the at least one container gripping device and the at least one in-feed device are in activation, the method comprises causing the at least one in-feed device to be de-activated such that the at least one in-feed device is no longer able to supply containers to the at least one container gripping device, maintaining the at least one container gripping device in activation at least until the containers that are being guided through the container capping machine by the at least one container gripping device have exited the container capping machine such that they are no longer being guided by the at least one container gripping device and causing the at least one container gripping device to be de-activated.

In accordance with a sixth broad aspect, the present invention provides a container capping machine. The container capping machine comprises a cap-engaging station for securing a cap onto a container, a torque measuring station for determining if the cap has been secured onto the container to at least a minimum required torque value and a rejection device in communication with the torque measuring station. The rejection device being operative for removing a container from continued travel along a production line, upon determination that the cap has not been secured onto the container to at least the minimum required torque value.

Other aspects and features of the present invention will become apparent to those ordinarily skilled in the art upon review of the following description of specific embodiments of the invention in conjunction with the accompanying figures.

DETAILED DESCRIPTION

Figure 1:
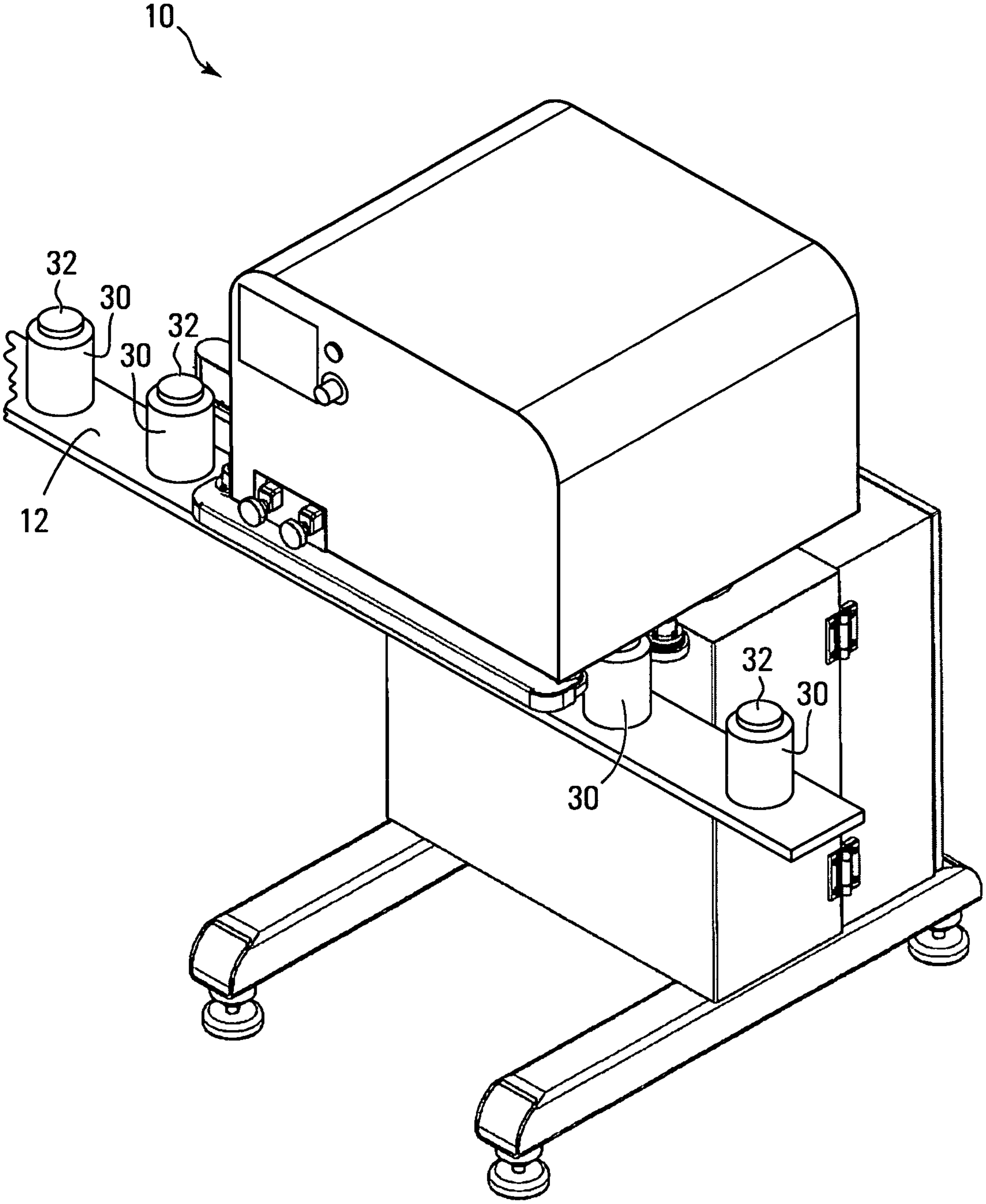
FIG. 1 shows a front perspective view of a container capping machine in accordance with a non-limiting embodiment of the present invention.

Shown in FIG. 1 is a container capping machine 10 that is suitable for use in container filling assembly lines for securing caps 32 onto filled containers 30. The container capping machine 10 is operative for rotating caps 32 in relation to their respective containers 30, such that the caps 32 are securely screwed onto the necks of the containers 30.

During operation, the containers 30 travel through the container capping machine 10 along a predetermined path. In the embodiment shown, the containers travel through the container capping machine 10 along a path 12 at a suitable speed for allowing the container capping machine 10 to screw the caps 32 onto the necks of the containers 30. In accordance with a first non-limiting embodiment, the path 12 may be a stationary path, such that the containers 30 are carried along the path via container gripping belts that will be described in more detail below. In this manner, the containers 30 simply slide along the path 12. Alternatively, the path 12 may be a conveyor belt, a sliding rail, or any other transportation mechanism for moving the containers 30 through the container capping machine 10.

When containers 30 enter the container capping machine 10 they are passed through a cap pick up station to pick up the caps 32. The placing of caps 32 on the containers 30 is known in the art, and as such will not be described in more detail herein.

Figure 2:
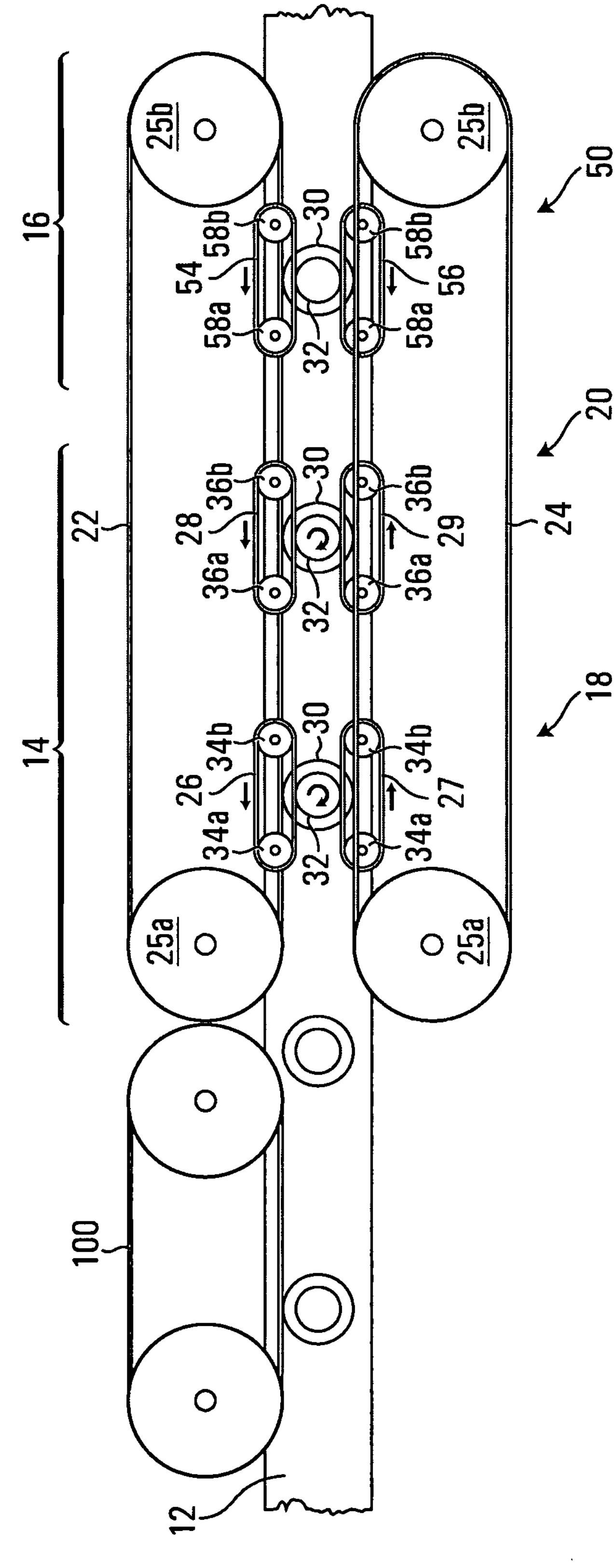
FIG. 2 shows a top representational view of a cap screwing station and torque measuring station in accordance with a non-limiting embodiment of the present invention.
Figure 3:
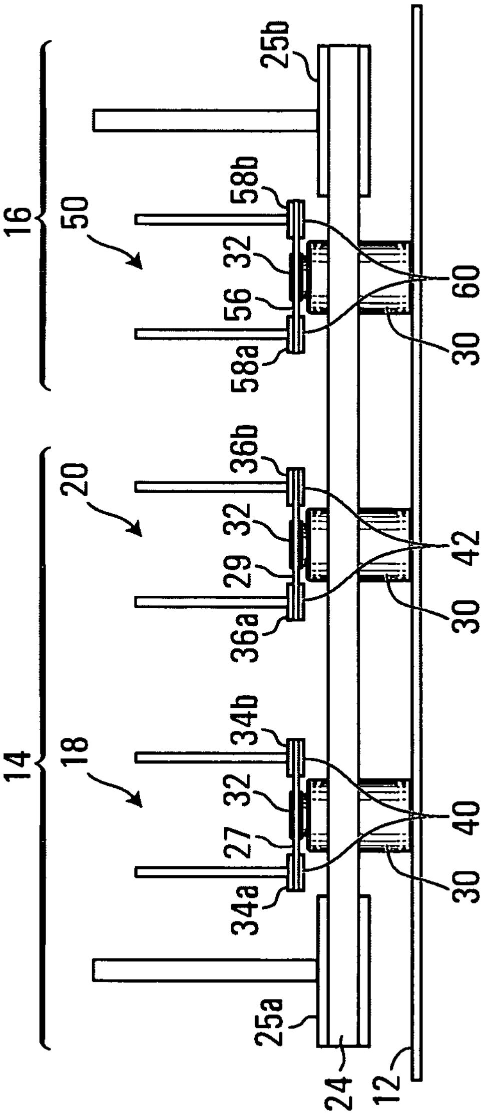
FIG. 3 shows a side representational view of the cap screwing station and torque measuring station of FIG. 3.

In accordance with the present invention, and as shown in FIGS. 2 and 3, the container capping machine 10 includes a cap applying station 14 and a torque measuring station 16. The cap applying station 14 includes a cap applying assembly 18 and a cap torquing assembly 20. The cap applying assembly 18 is operative for rotating the caps 32 in relation to their respective containers 30, so as to pre-screw the loose caps 32 onto their respective containers 30. The cap torquing assembly 20 is operative for applying a predetermined torque to the caps 32 for tightening the caps 32 securely onto their respective containers 30. An advantage of having a separate cap applying assembly 18 and cap torquing assembly 20, is that the length of each assembly 18 and 20 can be shorter than one long cap screwing assembly that does both the screwing and the torquing. This enables the container capping machine 10 to handle containers 30 that are positioned more closely together. In this manner, the container capping machine 10 is able to process more containers 30 within a given period of time.

Although the cap applying assembly 18 and the cap torquing assembly 20 are described herein as being separate, in an alternative embodiment, the container capping machine 10 may include only one capping assembly that is able to both screw the caps onto the containers, and provide enough torque to adequately secure the caps onto their respective containers.

As shown in FIGS. 2 and 3, the cap applying assembly 18 and the cap torquing assembly 20 include two container gripping belts 22 and 24. The container gripping belts 22 and 24 are operative for receiving the containers 30, and for transporting and stabilizing the containers 30 as they move through the container capping machine 10. In the embodiment shown, the two container gripping belts 22 and 24 are shown positioned opposite each other at a predetermined distance for receiving and gripping the containers 30. In a non-limiting embodiment of the present invention, the distance separating the two opposing container gripping belts 22 and 24 can be adjusted such that the container capping machine 10 can accommodate containers 30 of different sizes and shapes. As such, the belts 22 and 24 can be moved closer together or further apart depending on the size of the container 30 being handled.

Each of the two belts 22 and 24 is positioned around a pair of pulleys **25*a* and 25*b*. At least one of the pulleys 25*a* and 25*b* is driven by a motor (not shown) for causing the belts 22 and 24 to rotate. Each of the two belts 22 and 24 is caused to rotate at substantially the same speed, with one belt moving in a counter clock-wise direction, and the other belt moving in a clock-wise direction, such that the rotation of the two belts 22 and 24 does not cause the container 30 to spin while it is being gripped by the belts 22**.

The cap applying assembly 18 further includes a pair of cap engaging belts 26 and 27 and the cap torquing assembly 20 further includes a pair of cap engaging belts 28 and 29. In the embodiment shown, the two cap engaging belts 26 and 27 and the two cap engaging belts 28 and 29 are shown positioned opposite each other at a predetermined distance. In a non-limiting embodiment of the present invention, the distance separating the two opposing belts 26 and 27, and the distance separating the two opposing belts 28 and 29 can be adjusted such that they can accommodate caps 32 of different sizes and shapes. As such, the belts 26 and 27, and 28 and 29 can be moved closer together or further apart depending on the size of the caps 32 being tightened. It should be appreciated that the position of the cap engaging belts 26 and 27, and 28 and 29 can be adjusted independently of the position of the container gripping belts 22 and 24.

With respect to the cap applying assembly 18, the pair of cap engaging belts 26 and 27 are each positioned around two pulleys 34*a* and 34*b*. At least one of these pulleys 34*a* or 34*b* is driven by a motor (not shown) for causing the belts 26 and 27 to rotate. In the embodiment shown in FIG. 2, the containers 30 are moving in a direction from left to right, and the two belts 26 and 27 both rotate in a counter-clockwise direction. As such, when the caps 32 are engaged by the two belts 26 and 27, the belts 26 and 27 apply a tangential force to the caps that cause the caps 32 to spin clockwise in relation to the container 30, which causes the caps 32 to be screwed onto the containers 30. In addition, in order to screw the caps 32 onto the containers 30 quite quickly, the cap engaging belts 26 and 27 rotate at a faster rate than the container gripping belts 22 and 24. For example, the cap engaging belts 26 and 27 may rotate at twice the speed of the container gripping belts 22 and 24. The speed at which the cap engaging belts 26 and 27 rotate will be determined by an operator of the machine on the basis of the size of the caps 32 and the amount of spin or torque desired to be applied to the caps 32, among other possibilities.

Each of the belts 26 and 27 includes a cap engaging region 40 (shown in FIG. 3) that is the region that engages the caps 32. As mentioned above, the cap applying assembly 18 is operative for pre-screwing the caps 32 onto the containers 30, which means that this cap applying assembly 18 does not tightly screw the caps 32 onto the containers. In order to prevent the caps 32 from being screwed onto the containers 30 too tightly, various different factors can be controlled, such as the speed at which the cap engaging belts 26 rotate, and the torque applied by the belts 26 and 27 to the cap. For example, in certain non-limiting embodiments, the driven pulley, which for the sake of example will be driven pulley 34*b*, may be connected to a mechanical or electrical clutch that slips when a predetermined level of torque has been applied to the cap 32.

With respect to the cap torquing assembly 20, the pair of cap engaging belts 28 and 29 are positioned around pulleys 36*a* and 36*b*. At least one of these pulleys 36*a* or 36*b* is driven by a motor (not shown) for causing the belts 28 to rotate. In the embodiment shown, the two belts 28 and 29 both rotate in a counter-clockwise direction for causing the caps 32 to spin clockwise in relation to the container 30. This causes the caps 32 to be further screwed onto the containers 30 for tightening the caps 32 onto the containers 30. The cap engaging belts 28 and 29 are operative for rotating at a faster speed than the container gripping belts 22 and 24.

Each of the cap-engaging belts 28 and 29 includes a cap engaging region 42 (shown in FIG. 3) that is the region that engages the cap 32. As mentioned above, the cap torquing assembly 20 is operative for causing the caps 32 to be tightly secured onto the containers 30 to at least a minimum torque level. As such, it is the job of the cap torquing assembly 20 to tighten the caps 32 securely onto the containers 30. The speed of rotation of the belts 28 and 29 and the amount of force that can be applied to the caps 32, can be selected and calibrated such that at least a minimum torque level is applied to the caps 32. In accordance with a non-limiting embodiment, the driven pulleys, which for the sake of example will be pulleys 36*b*, may be connected to an electrical or mechanical torque limiting device, for determining when the predetermined amount of torque has been applied. For example, a mechanical or electrical clutch that is connected to the driven pulleys 36*b* may slip, such that no further torque is applied to the caps 32.

Once the containers 30 exit the cap applying station 14, the caps 32 should have been tightened onto the containers to within a pre-determined torque range, such that they have been tightened to at least a minimum required torque value. For safety and verification purposes, the container capping machine 10 of the present invention further includes the torque measuring station 16 that is able to ensure that the caps 32 applied to the container by the container capping station 14 meet a minimum required torque value. In this manner, and as will be described below, the torque measuring station 16 provides a separate, independent assembly for verifying the level of torque that has been applied to each one of the caps 32.

In accordance with a non-limiting embodiment, and as shown in FIG. 2, the container capping machine 10 includes an independent in-feed belt 100 that is positioned prior to the container gripping belts 22 and 24. The in-feed belt 100 is operative for supplying the containers 30 to the container gripping belts 22 and 24. The in-feed belt 100 is connected to an independent motor, such that the activation, deactivation and speed of rotation of the in-feed belt 100 can be controlled independently from the activation, deactivation and speed of rotation of the container gripping belts 22 and 24 of the container capping machine 10.

In previous container capping machines, when it was necessary to shut down the machine, there would still be containers 30 and caps 32 engaged by the container gripping belts and the cap engaging belts. This meant that abnormal forces would be applied to the caps 32 and/or containers 30 while the container capping machine 10 was being shut down, or started up. This could result in the containers 30 tipping over and jamming the machine, or the caps being applied such that they are too tight, too loose or misaligned on the containers 30. As such, the caps 32 that were applied to containers 30 during the start-up and shut-down operations, would not be screwed onto the containers 30 to the appropriate torque level and would have to be discarded.

In accordance with the present invention, in order to avoid having containers 30 and caps 32 positioned within the container gripping belts 22 and 24 and the cap engaging belts 26, 27, 28 and 29 at the time of shut-down (and start up), the in-feed belt 100 can be deactivated prior to shutting down the container gripping belts 22 and 24, such that the supply of containers 30 to the container gripping belts 22 and 24 stops. In this way, the in-feed belt 100 will prevent further containers 30 and caps 32 from entering the container capping machine 10. Once all the containers 30 and caps 32 that are being processed by the container gripping belts 22 and 24 and the cap engaging belts 26, 27, 28 and 29 have left the container capping machine 10, the container gripping belts 22 and 24 and the cap engaging belts 26, 27, 28 and 29 can then be shut down. Likewise, in the case of start up, the in-feed belt 100 is not activated until the container capping machine 10 has been initiated such that the container gripping belts 22 and 24, and the cap engaging belts 26, 27, 28 and 29 are functioning at a steady state. At that point, the in-feed belt 100 can be activated so as to start supplying containers 30 to the container gripping belts 22 and 24.

In addition to controlling the supply of containers 30 to the container gripping belts 22 and 24, the in-feed belt 100 can also regulate the speed at which the containers 30 are supplied to the container gripping belts 22 and 24. More specifically, by adjusting the speed of the in-feed belt 100, the rate at which containers 30 are supplied to the container gripping belts 22 and 24 can be controlled.

In accordance with a non-limiting embodiment, the in-feed belt 100 is controlled by a processing entity (such as processing entity 76 shown in FIG. 5) that is in communication with a motor (not shown) for causing the in-feed belt 100 to rotate. As mentioned above, the motor that causes the in-feed belt 100 to rotate is independent from the motor that causes the container gripping belts 22 and 24 to rotate, such that rotation of the in-feed belt 100 can be controlled independently from the rotation of the container gripping belts 22 and 24.

The processing entity that controls the motor for the in-feed belt 100 can be the same processing entity that controls the motor for the container gripping belts 22 and 24, and the cap engaging belts 26, 27, 28 and 29. Alternatively, the processing entity that controls the motor for the in-feed belt 100 can be dedicated to controlling the motor for the in-feed belt 100. In such a case, the processing entity that controls the motor of the in-feed belt 100 will be in communication with one or more processing entities that control the motors for the container gripping belts 22 and 24. In this manner, the processing entities that control the in-feed belt and the container gripping belts 22 and 24 can coordinate the operation of the in-feed belt 100 and the container gripping belts 22 and 24. In either case, the processing entity that is operative for controlling the activation and deactivation of the in-feed belt 100, is operative for doing so independently of the activation and deactivation of the container gripping belts 22 and 24. As such, the activation or deactivation of the in-feed belt 100 does not need to be done simultaneously with the activation or deactivation of the container gripping belts 22 and 24. In this manner, the in-feed belt 100 can be deactivated prior to the deactivation of the container gripping belts 22 and 24, and can be re-activated following the activation of the container gripping belts 22 and 24.

It should be appreciated that the in-feed belt 100 can also prevent supply of containers 30 to the container gripping belts during change over, during testing, and/or during troubleshooting.

The torque measuring station 16 will now be described in more detail with respect to FIGS. 2 and 3. As shown, the torque measuring station 16 includes a torque measuring assembly 50. In the embodiment shown, the container gripping belts 22 and 24, as described with respect to the cap applying station 14, continue to carry and/or support the containers 30 through the torque measuring assembly 50. It should be appreciated that in an alternative embodiment, the torque measuring station 16 may comprise separate container gripping belts.

The torque measuring assembly 50 includes a pair of cap engaging belts 54 and 56. The cap engaging belts 54 and 56 are positioned opposite each other, with a predetermined distance therebetween. The distance separating the cap engaging belts 54 and 56 can be adjusted so as to be able to accommodate caps 32 of different shapes and/or sizes. The position of the cap engaging belts 54 and 56 can be adjusted independently of the position of the container gripping belts 22 and 24. As such the cap engaging belts 54 and 56 can be moved closer together or farther apart depending on the size of the containers 30 and caps 32 being handled. Mechanisms and mounting arrangements for allowing the distance separating the belts 54 and 56 to be adjusted are known in the art, and as such will not be described in more detail herein.

Each of the cap engaging belts 54 and 56 is positioned around two pulleys 58*a* and 58*b*. At least one of these pulleys 58*a* and 58*b* is driven by a motor (not shown) for causing the belts 54 and 56 to rotate. For the purposes of the present description, the pulleys 58*b* will be described as being the driven pulleys, however, it should be appreciated that the pulleys 58*a* (or both pulleys 58*a* and 58*b*) could be the driven pulleys. During operation, the pulleys 58*a* and 58*b* cause the cap engaging belts 54 and 56 to rotate. More specifically, belt 54 rotates in a counter clockwise direction, and belt 56 rotates in a clockwise direction at a lower speed then belt 54, thus causing a tangential over-torquing force to be applied to the caps 32.

More specifically, belt 56 rotates in the clockwise direction at only a slightly lower speed than belt 54, such that no slippage occurs. The rotation of these two cap engaging belts 54 and 56 is such that a small amount of torque is applied to the caps 32.

In accordance with the present invention, a load cell, or other force reading mechanism known in the art, is in communication with the driven pulleys 58*b* for measuring the force that is applied to the caps 32 by the cap engaging belts 54 and 56. In an alternative embodiment, a load cell is in communication only with the driven pulley 58*b* of belt 56. Given that the caps 32 have already been tightened onto the containers 30 by the time they enter the torque measuring station 16, the tangential force applied to the caps 32 by the belts 54 and 56 should not cause the caps 32 to be tightened significantly more onto the containers 30.

Each of the cap-engaging belts 54 and 56 includes a cap engaging region 60 (shown in FIG. 3) which is the region of the cap-engaging belts 54 and 56 that engages the cap 32. As mentioned above, the purpose of the cap engaging belts 54 and 56 of the torque measuring assembly 50 is to apply a force to the caps 32, which can be measured so as to be able to determine whether each cap 32 has been screwed onto a respective container 30 to a minimum required torque value. In operation, as a cap 32 is engaged by the belts 54 and 56 in the cap engaging region 60, the belts 54 and 56 exert a tangential force against the cap 32, which thus applies a torque to the cap. Given that the cap 32 has already been screwed onto its container 30, to presumably a minimum required torque value, the cap 32 will apply a resistance against the rotation of the belts 54 and 56. While the cap 32 is traveling along the cap engaging region 60, a force measuring device, which could be a load cell, obtains measurements indicative of the torque exerted by the belts 54 and 56 onto the cap 32. In general, this measurement indicative of the torque is a force reading, that can then be converted into a torque value using known formulas, such as $T=F*d$ (where $F$=the tangential force exerted by the belt on the cap, and $d$=the radius of the cap). Given that ideally the cap will not rotate significantly in light of the force being exerted on it by the belts, the force (F) could also be considered the resistance exerted on the belts 54 and 56 by the cap.

The length of the cap engaging region 60 can be selected such that the amount of torque that is applied to a cap while it travels through the cap engaging region 60 is not sufficient to cause the cap 32 to be tightened significantly further onto the container 30. Instead, the length of the cap-engaging region 60 can be just long enough to obtain an accurate torque reading.

In addition, the driving mechanisms that control the driven pulleys 58*b* are such that they prevent the cap engaging belts 54 and 56 from applying more than a predetermined maximum amount of torque to the caps 32. More specifically, the driven pulleys 58*b* are in communication with either mechanical or electrical arrangements for preventing the belts 54 and 56 from applying too much torque to the caps 32. For example, a load cell, or other force measuring device, that is in communication with the driven pulleys 58*b* can obtain measurements of the force that is being applied to the caps by the belts 54 and 56. As such, when it is detected that the force (or torque) that is being applied to the cap 32 has reached a predetermined maximum torque value, a signal can be issued to the controller (later called 76) for causing the belts 54 and 56 to stop applying force to the caps 32. For example, the driving mechanism that causes a force to be applied to the caps 32 can be controlled based on electrical signals from the controller, or the driving mechanism can include a mechanical or electrical clutch that slips when a predetermined force is applied to the caps 32.

Therefore, regardless of how the drive mechanisms are controlled, the cap engaging belts 54 and 56 are generally configured such that they are unable to apply more than a predetermined maximum torque to the caps 32. This predetermined maximum torque value will generally be set to an upper limit of an acceptable torque range to which caps 32 can be applied to their respective containers 30. Above that predetermined maximum torque value, the caps 32 may be too difficult for an average person to remove from the containers.

Figure 5:
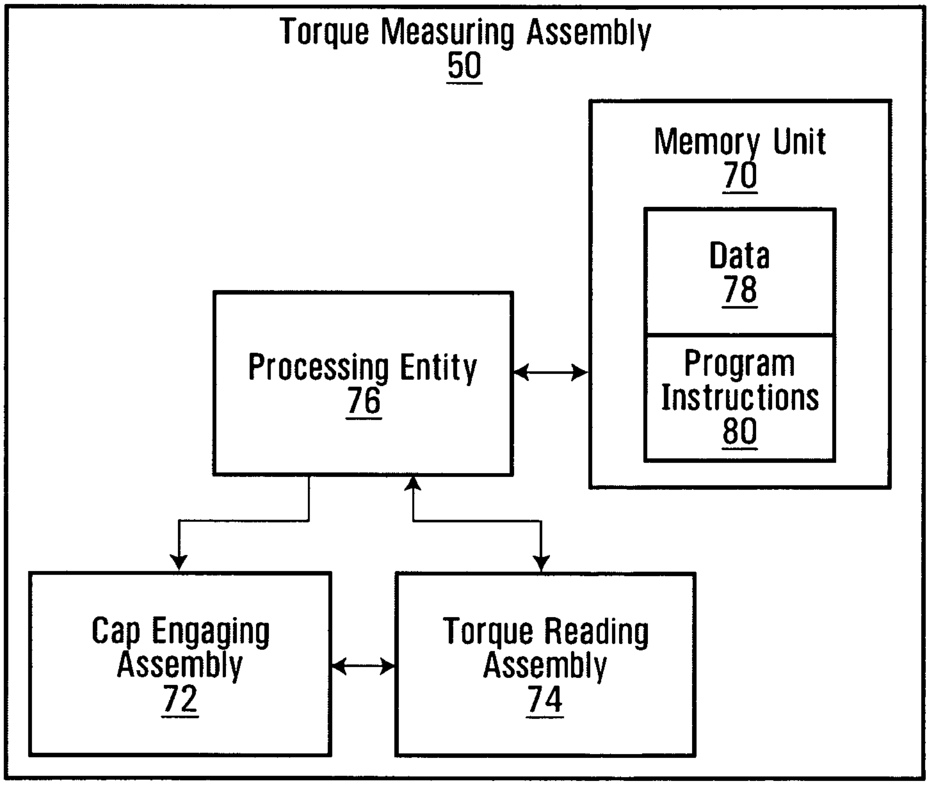
FIG. 5 shows a non-limiting functional block diagram of a torque measuring assembly in accordance with the present invention.

Shown in FIG. 5 is a non-limiting functional block diagram of the torque measuring assembly 50. As shown, the torque measuring assembly 50 includes a cap engaging assembly 72 and a torque reading assembly 74 that are in communication with each other, as well as a processing entity 76. The processing entity 76 is in communication with a memory unit 70 that includes data 78 and program instructions 80. Each of these components will be described in more detail below.

Figure 4:
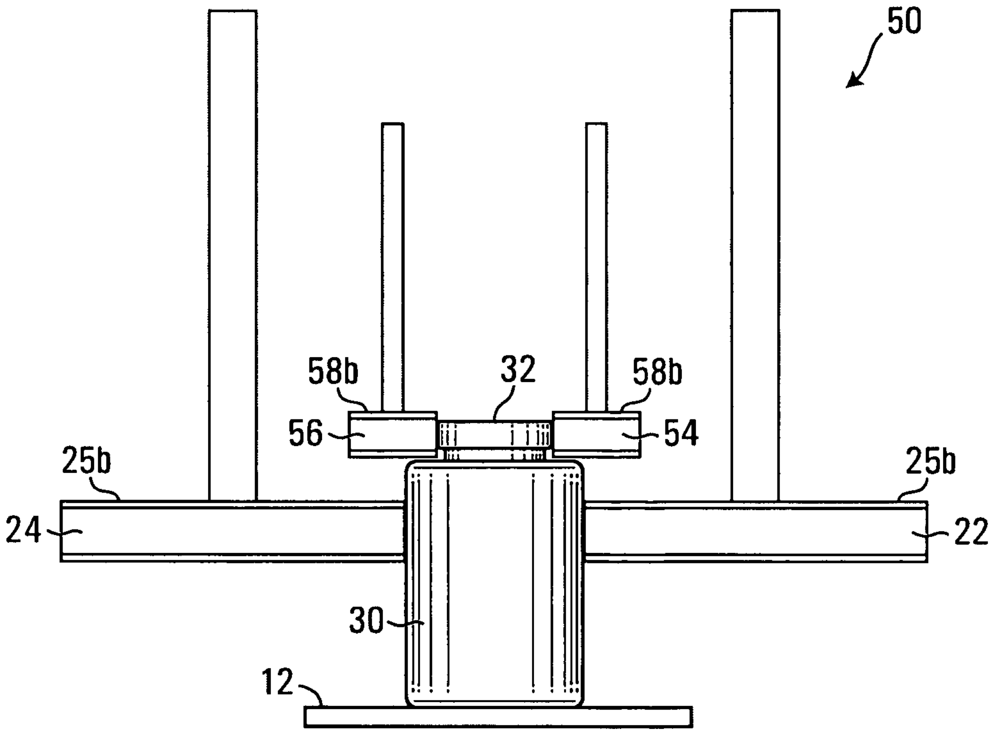
FIG. 4 shows a front representational view of a torque measuring assembly in accordance with a non-limiting embodiment of the present invention.

The cap engaging assembly 72 comprises the components necessary for engaging the caps 32 and for causing the caps 32 to spin in relation to the containers 34. In the non-limiting embodiment of the invention shown in FIGS. 2 through 4, the cap engaging assembly 72 comprises the pulleys 58*a* and 58*b*, and the cap engaging belts 54 and 56. Although not shown in the Figures, the cap engaging assembly 72 can also include a drive mechanism that includes a motor and a gear box for causing the pulleys 58*a* and 58*b* to rotate. It should be appreciated that in alternative embodiments of the present invention, the cap engaging assembly 72 may not include the pulleys 58*a* and 58*b* and/or the belts 54 and 56 and instead, may include different components, such as rotating discs or wheels.

The torque reading assembly 74 comprises the necessary components for obtaining measurements indicative of the torque applied to the caps 32. For example, the measurements may include a reading of the tangential force being applied to the caps 32 by the cap engaging assembly 72, from which a torque measurement can be derived. In accordance with a non-limiting example of implementation, the torque reading assembly 74 includes a torque sensing device that is in communication with at least one of the driven pulleys 58*b*. The manner in which the torque sensing device is mounted to the driven pulleys 58*b* is known in the art, and as such will not be described in more detail herein. The torque sensing device is preferably an electronic device, such as an electronic load cell, that converts a force into an electrical signal. In most electronic load cells, the force is detected via one or more strain gauges and is then converted into an electrical signal. It should be appreciated that other types of load cells are also within the scope of the present invention, such as hydraulic load cells or piezo electric load cells. Once a reading of the force has been obtained, the torque measurement can be obtained using a simple formula: T=F*d (where F=the tangential force applied to the cap and d=the radius of the cap 32). This torque measurement may be calculated by the load cell if the load cell includes processing capability, or alternatively, the torque measurement can be calculated by the processing entity 76 upon receipt of the force reading from the load cell. As such, in certain embodiments, the torque reading assembly 74 does not actually derive a torque measurement.

The processing entity 76 can include any type of processing unit (whether located locally or remotely) for obtaining readings from the torque reading assembly 74. For example, the processing entity 76 may be embodied as an on-board computing unit that is dedicated to the container capping machine 10. Alternatively, the processing entity 76 may be embodied as a PC, such as a desktop computer, a laptop, or a computer tablet, among other possibilities. The processing entity 76 may be located in proximity to the container capping machine 10, and connected to the container capping machine 10 via wires and cables or via a wireless connection. Or alternatively, the processing entity 76 may be located remotely from the container capping machine 10 such that is in communication with the container capping machine 10 over a network such as an intranet or internet.

As mentioned above, the processing entity 76 is in communication with a memory unit 70 over a communication bus. The memory unit 70 includes data 78 and program instructions 80. The processing unit 76 is adapted to process the data 78 and the program instructions 80 in order to implement the functionality described herein.

Figure 6:
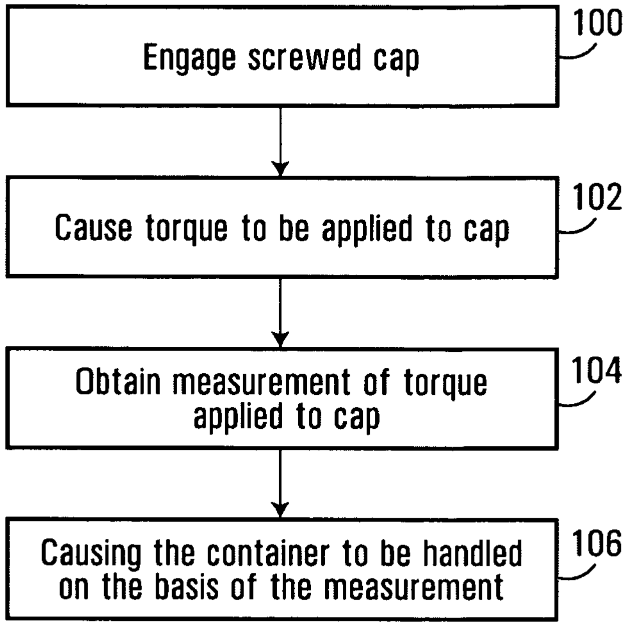
FIG. 6 shows a non-limiting flow diagram of a process performed by the torque measuring assembly of the present invention.

The manner in which the torque measuring assembly 50 operates will now be described in more detail with respect to the flow chart shown in FIG. 6. It should be appreciated that the torque measuring assembly 50 is positioned following the cap applying station 14, and as such receives containers 30 that have already had the caps 32 secured thereon. The torque measuring assembly 50 is positioned following the cap applying station 14 so as to ensure that the caps 32 have been screwed onto the containers 30 to at least a minimum required torque value.

Firstly, at step 100, the torque measuring assembly 50, and specifically the cap engaging assembly 72, engages a screwed cap 32. In the non-limiting embodiment shown in the Figures, it is the cap engaging belts 54 and 56 of the torque measuring assembly 50 that engage the cap 32. At the same time, the container 30 on which the cap 32 has been screwed, is stabilized via the container gripping belts 22 and 24. In this manner the container gripping belts 22 and 24 stabilize the container 30 as the container 30 and cap 32 travel through the torque measuring assembly 50.

As shown in the block diagram of FIG. 5, the processing entity 76 is in communication with the cap engaging assembly 72 (which includes the cap engaging belts 54 and 56), such that the processing entity 76 can control the operation of the cap engaging belts 54 and 56. More specifically, the processing entity 76 can control the operation of the motor (not shown) that drives the cap engaging belts 54 and 56. For example, the processing entity 76 can cause the speed of the belts 54 and 56, and in some cases, the amount of force that can be applied by the belts 54 and 56 onto the caps 32, to be controlled.

At step 102, a torque is applied to the caps 32. Although step 102 is depicted following step 100, in practice, a torque will be applied to the caps 32 as soon as the caps 32 are engaged by the belts 54 and 56. As described above, when the cap engaging belts 54 and 56 engage a cap 32, they apply a tangential force to the cap 32, which causes a torque to be applied to the cap. It should be appreciated that the belts 54 and 56 feel an equivalent resistance exerted on them by the cap 32.

At step 104, the torque reading assembly 74 obtains a measurement indicative of the torque applied to the cap 32. Given that the cap 32 has already (presumably) been screwed onto the container 30 via the cap screwing station 14, the cap 32 that is engaged by the cap engaging belts 54 and 56 will apply a resistance against the rotation of the belts 54 and 56. The amount of resistance applied against the cap engaging belts 54 and 56 will vary depending on how tightly the cap 32 has been screwed onto the container prior to being engaged by the cap engaging belts 54 and 56. For example, in the case where the cap 32 has not been screwed onto the container very tightly, then the cap will apply a relatively low resistance against the belts 54 and 56. In fact, the rotation of the belts 54 and 56 may cause the cap 32 to be further tightened. And conversely, in the case where the cap 32 has already been screwed onto the cap quite strongly, the cap 32 will apply a higher resistance against the belts 54 and 56. A measurement of resistance (i.e. the force against the rotation of the belts 54 and 56) will be obtained by the torque reading assembly 74 (which could include a load cell or other force reading apparatus) as the cap 32 is engaged by the cap engaging belts 54 and 56. This measurement of resistance against the cap engaging belts 54 and 56 can be measured either continually, or intermittently, as the cap 32 travels through the cap-engaging region 60.

Once the cap 32 has left the cap engaging region 60 of the torque measuring assembly 50, the measurements indicative of the torque applied to the cap (which could include one or more measurements of force or torque) are used in order to determine whether the cap 32 has been screwed onto the container 30 to the minimum required torque value. This is generally done by taking the maximum resistance value that was obtained by the torque reading assembly 74 while the cap 32 was engaged within the cap engaging region 60. In most cases, this will be the last value that is obtained before the cap 32 leaves the cap engaging region 60.

In accordance with a first non-limiting example, the measurements that are obtained by the torque reading assembly 74 are sent from the torque reading assembly 74 to the processing entity 76, in real time, as they are being obtained by the torque reading assembly 74. In an alternative embodiment, the measurements from the torque reading assembly 74 are only sent to the processing entity 76 once the cap 32 has left the cap engaging region 60. In this embodiment, the torque reading assembly 74, or a memory unit associated with the torque reading assembly 74, is able to store the values until the cap 32 has left the cap engaging region 60. In yet a further embodiment, instead of providing a series of measurements of the force or torque values measured as the cap 32 moves through the torque measuring assembly 50, the torque reading assembly 74 provides only a single measurement to the processing entity 76. For example, only the final measurement or the highest measurement that is obtained by the torque reading assembly 74 is sent to the processing entity 76.

The torque reading assembly 74 may convert the force/resistance readings obtained into torque values, such that it is the torque values that are supplied to the processing entity 76. Alternatively, the torque reading assembly 74 may simply provide the force/resistance readings to the processing entity 76, such that it is the processing entity 76 that converts the force/resistance readings into torque values. As described above, a measurement of the torque that has been applied to the cap 32 can be obtained using the following formula: $\tau=F*d$, where F=the tangential force reading applied to the cap (or otherwise put, the resistance felt by the belts 54) and d=the radius of the cap 32.

It should be appreciated that the measurement indicative of the torque that has been applied to the cap 32 may not necessarily be a measurement of the actual amount of torque that has been applied to the cap 32. Instead, it may simply be a value of the torque that could be obtained by the torque reading assembly 74 while the cap 32 passes through the torque measuring station 16. In reality, it is possible that more torque has been applied to the cap 32 than can be measured during the brief interval during which the cap 32 passes through the torque measuring station 16.

Ideally, each cap 32 has been applied to its respective container 30 to within at least a minimum required torque value by the container applying station 14. This minimum required torque value may be different depending on the type of cap and the contents of the containers. For example, in the case of containers that store pharmaceutical contents, it may be desirable that the cap is tightened onto the container to a greater level of torque than a container that stores non-pharmaceutical items. The cap engaging belts 54 and 56 are calibrated such that if the cap is tightened to the minimum required torque value, then the torque reading assembly 74 will obtain a reading that falls within a predetermined torque range. However, if the cap 32 has not been tightened to within the predetermined torque range, then the torque reading assembly 74 will obtain a reading that falls outside the predetermined torque range. In most cases, the minimum required torque value will be at the bottom end of the predetermined torque range.

The predetermined torque range can be stored within the data 78 of the memory unit 70.

At step 106, the container 30 is caused to be handled, once released from the cap engaging assembly 72, on the basis of the one or more measurements of the torque obtained at step 104. In accordance with a non-limiting embodiment, the container 30 is caused to be handled on the basis of whether or not one or more torque measurements obtained from the torque reading assembly 74 fall within the predetermined torque range. The predetermined torque range can include a minimum required torque value and a maximum required torque value, such that the range includes all torque values between that minimum and maximum required torque range. Or the predetermined torque range can simply be a minimum required torque value, such that any torque value that is above the minimum required torque value falls within the predetermined torque range.

The determination as to whether or not the one or more torque measurements obtained at step 104 falls within the predetermined acceptable torque range is performed by the processing entity 76. In accordance with a non-limiting embodiment, this determination can be done via a simple comparison algorithm that compares one or more measured torque values with the predetermined torque range. This may be done by checking whether at least one of the measured torque values (such as the maximum torque value measured) is greater than or equal to a minimum required torque value, and less than or equal to a maximum allowed torque value.

In the case where the measured torque value falls within the predetermined torque range, the processing entity 76 may determine that the cap has been screwed onto the container to at least the minimum required torque value. However, in the case where the measured torque value falls outside the predetermined torque range, the processing entity 76 may determine that the cap 32 has either been screwed onto the container too loosely or too tightly.

In yet a further non-limiting example, the processing entity 76 may simply compare a measured torque value (such as the maximum torque value measured) to the predetermined torque range, by determining whether the measured torque value is greater than a predetermined minimum required torque value. As such, it should be appreciated that there are numerous algorithms that could be used by the processing entity 76 in order to determine whether a cap 32 has been screwed onto a container 30 to an acceptable torque level. The above described algorithms are presented for the sake of example only.

It should be appreciated that the processing entity 76 may use one or more of the measured torque values when performing this comparison algorithm. For example, the processing entity 76 may compare only the maximum torque value obtained by the torque reading assembly 74. Or the processing unit 76 may consider an average of the torque values obtained by the torque reading assembly 74. In yet a further alternative, a range of values could be used, such that the processing entity 76 considers a plurality of measured torque values when considering how to handle the containers 30.

In the case where the cap 32 is determined to be screwed onto the container 30 to at least the minimum required torque level, the container 30 will be handled in a first way once it has been released from the torque measuring assembly 50. For example, when the one or more measured torque values fall within the predetermined acceptable torque range, meaning that the cap 32 has been screwed onto the container 30 to an acceptable torque level, then the container may be handled such that it is allowed to continue towards the next packaging station (which my be to apply a label, or to package the container in a box to be shipped to a purchaser).

In contrast, in the case where it is determined that the cap 32 is not screwed onto the container 30 to at least the minimum required torque level, then the container 30 will be handled in a different way once it has been released from the torque measuring assembly 50. For example, when a measured torque value falls outside the predetermined acceptable torque range, such that it is determined that the cap 32 has not been screwed onto the container 30 tightly enough or too tightly, then container 30 may be handled in one or more of the following ways:

- the container 30 may be rejected such that is removed from continuing along a production path for the containers;
- the container 30 may be caused to go through the cap applying station 14 again, such that the cap 32 can be further tightened;
- the container 30 can be identified to an operator of the container capping machine 10, via a visual indicator on a screen or an audible indicator issued over one or more speakers, as being defective.

In accordance with a non-limiting embodiment, it is the processing entity 76 that causes the container 30 to be handled on the basis of the measured torque values that are obtained from the torque reading assembly 74. For example, when the processing entity 76 determines that one or more measured torque values fall outside the predetermined acceptable torque range, then the processing entity 76 can issue a signal to a container rejection device for causing the container rejection device to remove the container 30 from the production line.

Figure 7:
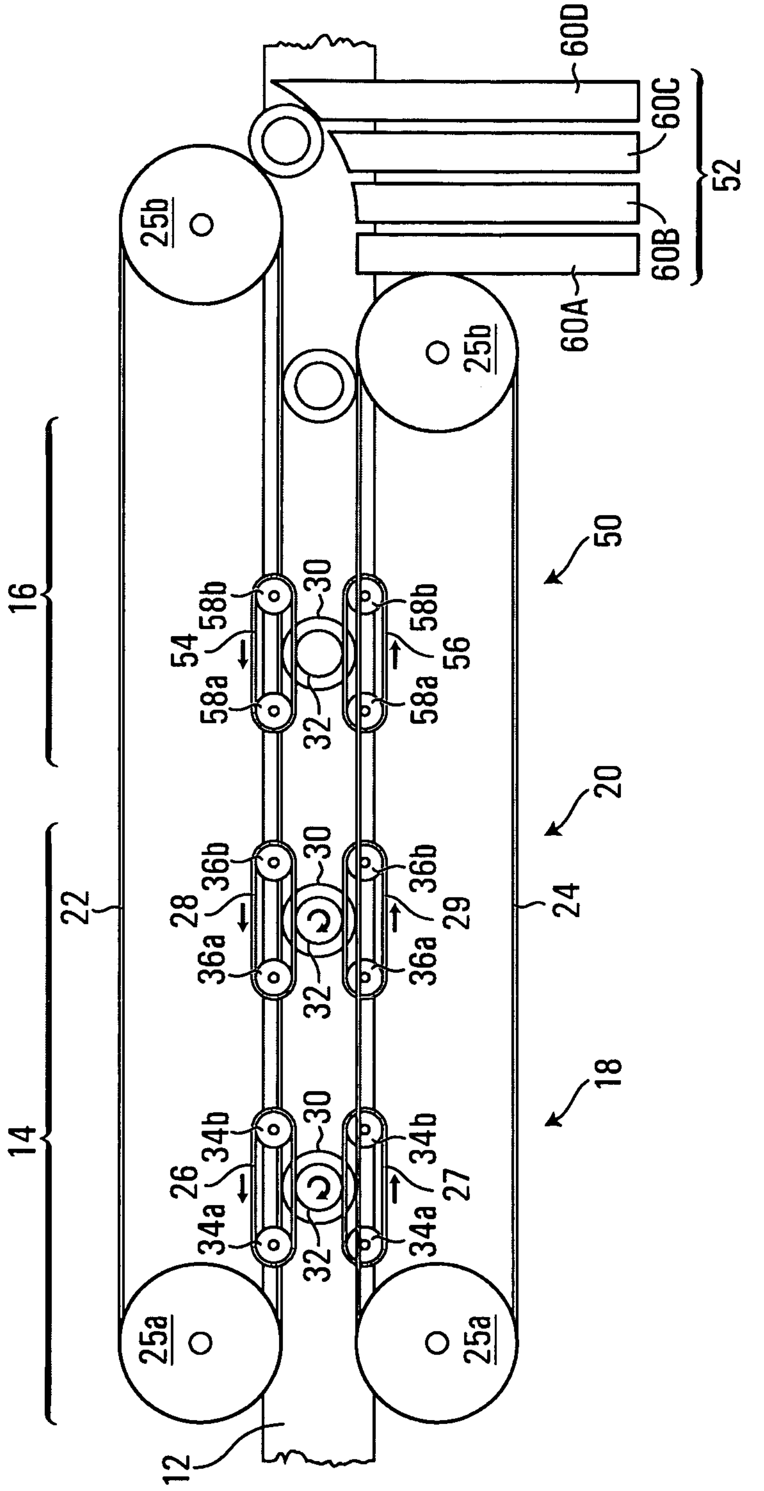
FIG. 7 shows a non-limiting alternative top representational view of a cap screwing station and torque measuring station in accordance with a non-limiting embodiment of the present invention.

Shown in FIG. 7 is a non-limiting example of a rejection device 52. The rejection device 52 includes the container gripping belt 22 and a set of pushing devices 60*a*, 60*b*, 60*c* and 60*d* that are operative for pushing defective bottles against the container gripping belt 22 such that the container gripping belt 22 can lead the defective containers away from continued travel along path 12.

In the embodiment shown, container gripping belt 22 extends farther along the path 12 than container gripping belt 24. In this manner, the end portion of the container gripping belt 22 can work in conjunction with the set of pushing devices 60*a*, 60*b*, 60*c* and 60*d* to remove defective containers from continued travel along the production path 12. It should be appreciated that in an alternative embodiment, the container gripping belt 22 can be the same length as the container gripping belt 22, and a separate container gripping belt can be positioned following the container gripping belt 22. In this manner, the separate container gripping belt can work together with the pushing devices 60*a*, 60*b*, 60*c* and 60*d*, in order to act as a rejection device.

As shown, the pushing devices 60*a*, 60*b*, 60*c* and 60*d* are positioned on the opposite side of the path 12 from the container gripping belt 22. The default position of the pushing devices 60*a*, 60*b*, 60*c* and 60*d* is such that they do not obstruct the travel of non-defective containers 30 along the path 12. However, in operation, when the processing entity 76 has detected a defective container, a signal is issued to the pushing devices 60*a*, 60*b*, 60*c* and 60*d* of the rejection device 52. The signal causes the pushing devices 60*a*, 60*b*, 60*c* and 60*d* to extend forward one-by-one in order to make contact with the defective container 30. In accordance with a non-limiting embodiment, the pushing devices 60*a*, 60*b*, 60*c* and 60*d* are activated by pistons that cause the pushing devices to move forwards and backwards. The pushing devices 60*a*, 60*b*, 60*c* and 60*d* cause the defective container 30 to be pushed against the container gripping belt 22. The shape of the pushing devices 60*a*, 60*b*, 60*c* and 60*d*, as well as their sequential movement creates an arcuate path for the defective container, such that the defective container curves around the pulley 25*b*, and is removed from continued travel along the path 12. As such, the rejection device 52 creates an alternative "rejection" path that can be used to remove defective containers from continued travel along the production line 12.

In the case where a container is determined by the torque measuring assembly 50 to be defective (meaning that the cap is too tight, too loose, misaligned, etc. . . . ) then a signal can be sent to the rejection device 52 for causing the actuation of the pushing devices 60*a*, 60*b*, 60*c* and 60*d*, which push the defective container against the container gripping belt 22 for removing the defective container from continued travel along the production line. The defective containers may be lead to a disposal bin, or other container receptacle positioned behind the container capping machine 10. In this manner, defective containers are automatically removed from continued travel along the production line when they are discovered to be defective.

Alternatively, the defective containers can be handled by causing them to be identified to an operator of the container capping machine 10. For example, the processing entity 76 can cause an indication to be provided to an operator of the torque measuring assembly indicating that the container 30 is faulty, such that the operator can then chose how to handle the container.

For example, the processing entity 76 can be in communication with a display unit (not shown), such as a display screen, a printer, a personal digital assistant, etc. . . . As such, the operator of the torque measuring assembly 50 can receive the indication that a container is defective via a visual signal displayed on the display unit. Alternatively, the processing entity 76 can be in communication with a set of speakers, such that the operator can be provided with the indication of a defective container via an audible signal, such as a beeping or a siren. At that point the operator can remove the container, or send the container back to the cap applying station 14 for further processing.

It should be appreciated that during operation, the torque measuring assembly 50 receives a series of successive containers 30 onto which have been secured respective caps 32. In accordance with a non-limiting example of implementation, as the series of containers 30 pass through the torque measuring assembly 50, the processing entity 76 is operative for causing the measurements of the torque associated with subsequent caps 32 to be displayed on the display unit. In addition, in the case where the torque associated with a given cap 32 falls outside of the predetermined torque range, the processing entity 76 is operative for causing an indication that the cap 32 (or the associated container 30) is defective to be displayed on the display unit. In this manner, an operator of the torque measuring assembly 50 can determine the best course of action for handling the defective container 30.

As shown in FIG. 5, the torque measuring assembly 50 includes a memory unit 70. In accordance with a non-limiting example of implementation of the present invention, the one or more resistance measurements and/or torque measurements associated with subsequent caps 32 can be stored within the data 78 of the memory unit 70. These resistance measurements and/or torque measurements can be used in order to generate statistics associated with the operation of the torque measuring assembly 50. It should be appreciated that the statistics can include any type of information that can be generated on the basis of the resistance measurements/torque measurements.

For example, the statistics may include:

- a graph of the resistance/torque measurements for a single cap 32 as it travels through the cap engaging region 60 of the torque measuring assembly 50. This graph may be displayed on a display unit such that an operator of the container capping machine 10 can view the forces that the cap 32 experiences as it travels through the cap engaging assembly 50;
- an indication of the number or percentage of containers 30 that have been determined to be defective;
- an indication of the maximum torque value that has been measured for one or more of the caps 32 that have gone through the torque reading assembly 50.

On the basis of these statistics, different parameters of the torque measuring assembly 50, or the container capping machine 10 can be adjusted. For example, in the case where too many containers are being rejected because the caps 32 are not being applied tightly enough, modifications can be made to the cap applying assembly 14 such that more torque is applied to the caps 32.

It should be appreciated that the torque measuring assembly 50 of the present invention can be integrally included within a capping machine 10, as shown in FIGS. 2 and 3, or alternatively, the torque measuring assembly 50 can be a stand-alone component that can be retrofitted into existing container capping machines, or that can be added as a separate station in many container filling production lines.

Alternative Embodiment

Figure 8:
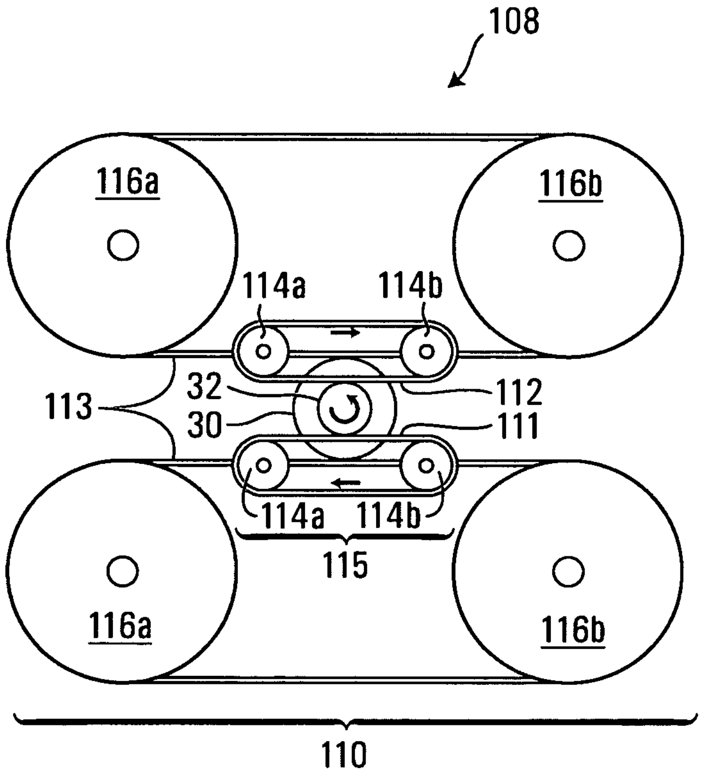
FIG. 8 shows a top representational view of a torque measuring assembly in accordance with a second non-limiting embodiment of the present invention.
Figure 9:
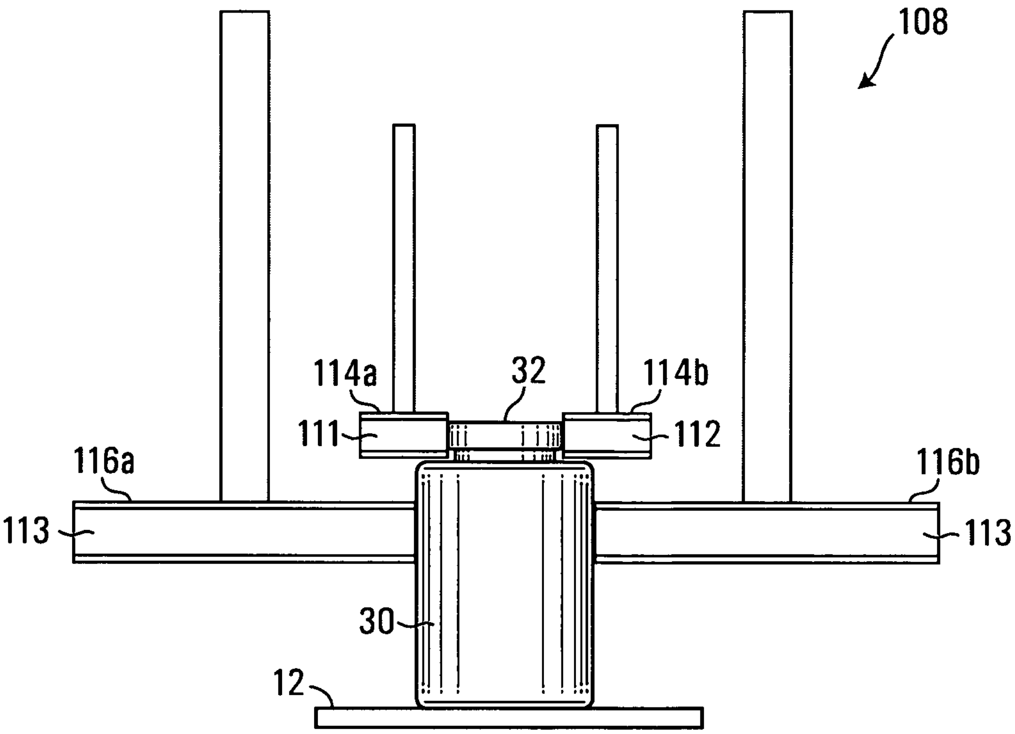
FIG. 9 shows a side representational view of the torque measuring assembly of FIG. 7.
Figure 10:
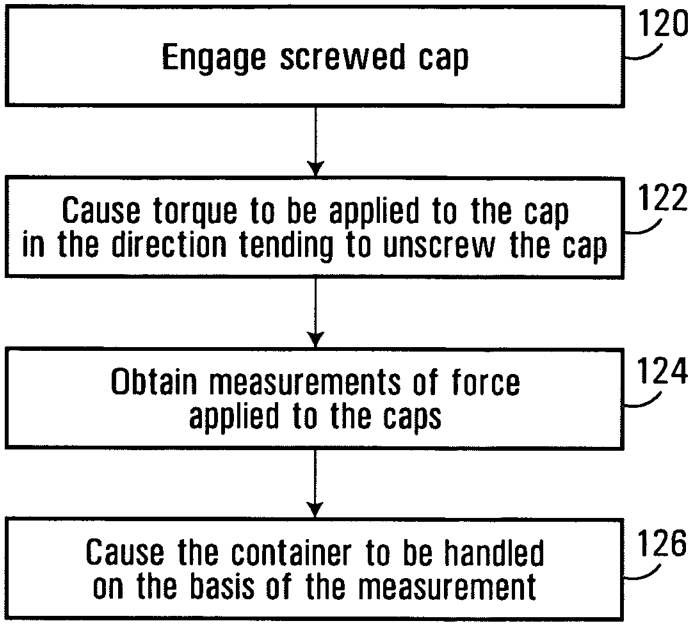
FIG. 10 shows a non-limiting flow diagram of a process performed by the torque measuring assembly of FIG. 7.

Shown in FIGS. 8 and 9 is a torque measuring station 110 in accordance with an alternative non-limiting embodiment of the present invention. As will be explained in more detail below, in this alternative embodiment, the torque measuring station 110 is operative for applying a torque to the cap 32 in a direction tending to unscrew the cap 32 from the container 30.

As shown in FIGS. 8 and 9, the torque measuring station 110 includes a torque measuring assembly 108 that comprises a pair of container gripping belts 113 and a pair of cap engaging belts 111 and 112. Although container gripping belts 113 are shown in FIGS. 8 and 9, in an alternative embodiment, the container gripping belts 22 and 24 that are common with the cap applying station 14 could be used. The two container gripping belts 113 are shown positioned opposite each other at a predetermined distance which can be adjusted so as to be able to accommodate containers 30 of different shapes and/or sizes.

In addition, the cap engaging belts 111 and 112 are also shown positioned opposite each other, with a predetermined distance therebetween. The distance separating the cap engaging belts 111 and 112 can be adjusted so as to be able to accommodate caps 32 of different shapes and/or sizes. The position of the cap engaging belts 111 and 112 can be adjusted independently of the position of the container gripping belts 113. As such the belts 111, 112 and 113 can be moved closer together or farther apart depending on the size of the containers 30 and caps 32 being handled.

Each of the two container engaging belts 113 is positioned around a pair of pulleys **116*a* and 116*b*. At least one of the pulleys 116*a* and 116*b* is driven by a motor (not shown) for causing the belts 113 to rotate. For the purposes of the present description, the pulleys 116*b* will be described as being the driven pulleys, however, it should be appreciated that the pulleys 116*a* (or both the pulleys 116*a* and 116*b*) could be the driven pulleys. During operation, the pulleys 116*b* cause the belts 113 to rotate. More specifically, the two belts 113 are caused to rotate at substantially the same speed, with one belt moving in a counter clock-wise direction, and the other belt moving in a clock-wise direction, such that the rotation of the two belts 113 does not cause the container 30 to spin while it is being gripped by the belts 113. As best shown in FIG. 9, the container gripping belts 113 are provided for stabilizing and supporting the containers 30 as they travel through the torque measuring assembly 108**.

The pair of cap engaging belts 111 and 112 are each positioned around two pulleys **114*a* and 114*b*. At least one of these pulleys 114*a* and 114*b* is driven by a motor (not shown) for causing the belts 111 and 112 to rotate. For the purposes of the present description, the pulleys 114*b* will be described as being the driven pulleys, however, it should be appreciated that the pulleys 114*a* (or both the pulleys 114*a* and 114*b*) could be the driven pulleys. During operation, the pulleys 114*b* cause the belts 111 and 112 to rotate. More specifically, both belts 111 and 112 are caused to rotate in a clockwise direction, such that a tangential force is applied to the caps 32. This tangential force is applied to the caps 32 in a direction tending to unscrew the caps 32**.

The torque measuring assembly 108 in accordance with the alternative embodiment shown in FIGS. 8 and 9 includes the same functional components, as the torque measuring assembly 50 shown in FIG. 5, namely a torque reading assembly 74, a processing unit 76 and a memory 70 as described with respect to FIG. 5.

The tangential force that is applied to a cap 32 by the cap engaging belts 111 and 112 is such that it is slightly lower than required for causing the cap to be unscrewed, assuming the cap 32 was properly applied to the container 30. More specifically, the force that is applied to a cap 32 by the cap engaging belts 111 and 112 is such that if the cap 32 was screwed onto the container 30 to the minimum required torque value, then the cap engaging belts 111 and 112 will not apply enough force to unscrew the cap 32 from the container 30. Instead, the cap 32 will apply a resistive force against the cap engaging belts 111 and 112, which can be measured by the torque reading assembly 74.

However, if the caps 32 have not been screwed onto the containers 30 to the minimum required torque value, then the force that is applied by the cap engaging belts 111 and 112 will be sufficient to cause the cap 32 to unscrew from the container 30. In such a case, the cap 32 will not apply much of a resistive force against the belts 111 and 112 at all.

Each of the cap-engaging belts 111 and 112 includes a cap engaging region 115 that is the region that engages the caps 32. In the same manner as described with respect to FIG. 5, the torque reading assembly 74 includes a load cell or other force reading mechanism known in the art, that is in communication with the driven pulleys 114*b* of the cap engaging belts 111 for measuring the resistance applied against the belts 111 and 112 by the caps 32. As mentioned above, the purpose of the cap engaging belts 111 and 112 of the torque measuring assembly 108 is to cause a force to be applied to the caps 32, such that a measurement can be taken to determine whether the cap 32 has been screwed onto the container to a minimum required torque value. In operation, as a cap 32 is engaged by the belts 111 and 112, the belts 111 and 112 exert a tangential force against the cap 32 in a direction tending to unscrew the cap. Given that the cap 32 has already been screwed onto the container 30, to presumably a minimum torque level, the cap 32 will apply a resistance against the rotation of the belts 111 and 112. While the cap 32 is traveling along the cap engaging region 115, the torque reading assembly 74 obtains measurements of the resistance exerted by the cap 32 onto the belts 111 and 112.

If the resistive force applied against the belts 111 and 112 by the cap 32 reaches a certain predetermined level, then it can be assumed that the cap 32 has been screwed onto the container 30 to an acceptable minimum torque value. However, in the case where there is very little resistive force exerted against the belts 111 and 112, or the resistive force suddenly drops, then it means that the tangential force that has been applied to the cap engaging belts 111 and 112 by the cap 32 was not sufficient enough, and the cap 32 became unscrewed. In such a case, it can be assumed that the cap 32 was not screwed onto the container 30 tightly enough.

The driving mechanism that controls the driven pulleys 114*b* controls the force that the cap engaging belts 111 and 112 apply to the caps, such that the force is slightly lower than the force required to unscrew the caps 32 if the caps 32 were screwed onto the containers 30 to the minimum required torque value. More specifically, the driven pulleys 114*b* are in communication with either mechanical or electrical arrangements for controlling and/or limiting the force that is applied by the cap 32 to the engaging belts 111 and 112. The force that is applied should be slightly lower than the force required to unscrew the caps 32 if they were screwed onto the containers 30 to the minimum required torque value, but the force would be less if the caps 32 were not screwed onto the containers to the minimum required torque value, since the caps 32 would become unscrewed and not apply any resistance to the belts 111 and 112.

The cap engaging belts 111 and 112 are able to apply a predetermined force value that is slightly lower then the minimum required torque value to which the caps 32 should have been applied to the containers 30. In accordance with a first non-limiting example, the driven pulleys 114*b* are in communication with a sensing device that is in communication with an electrical or mechanical clutch, such that once the predetermined force value has been achieved, the clutch slips such that the belts 111 and 112 no longer apply any force to the caps 32. In an alternative arrangement, the torque reading assembly 74 that is operative for obtaining measurements of the resistive force exerted on the belts 111 and 112 can detect when the predetermined force value has been met, and can issue a signal to a processing unit (or other controller) for causing the belts 111 to cease applying a tangential force to the caps 32. In either case, if the resistance applied by the caps 32 onto the cap engaging belts 111 and 112 reaches this predetermined force value, then the belts 111 and 112 cease to apply any further force, and the cap 32 is considered to be secured to the container 30 to the minimum required torque value.

Whereas, in the case where the predetermined force value that should be applied against the cap engaging belts 111 and 112 by the cap 32 is not met, or in the case where the predetermined force value is met, followed by a sharp decrease in resistance felt by the belts 111 and 112, it will be assumed that the cap has become unscrewed, and as such does not meet the minimum required torque value.

The torque measuring assembly 108 in accordance with this alternative example of implementation operates in accordance with the method described with respect to FIG. 9. At step 120, a cap 32 is engaged by the cap engaging assembly 74, which in the case of the torque measuring assembly 108 means that the cap 32 is engaged by the cap engaging belts 111 and 112. At the same time, the container 30 on which the cap 32 has been screwed is engaged by the container gripping belts 113.

At step 122, a force is applied to the cap 32 by the cap engaging belts 111 and 112 in a direction tending to over torque the cap 32 from the container 30. Then, at step 104, the torque reading assembly 74 obtains a reading of the resistance applied against the cap engaging belts 111 and 112 by the cap 32. A measurement of resistance (i.e. the force against the rotation of the belts 111 and 112) will be obtained by a load cell, or other force reading device, as the cap 32 is engaged by the cap engaging belts 111 and 112. Given that the cap 32 has already (presumably) been screwed onto the container 30 to a minimum required torque value, the cap 32 that is engaged by the cap engaging belts 111 and 112 will apply a resistance against the rotation of the belts 111 and 112. So long as there is a resistance against the rotation of the belts 111 and 112, the torque reading assembly 74 will obtain measurements of the resistive force applied. On the basis of these measurements, the processing entity 76 will determine that the belts 111 and 112 are not applying enough torque to cause the cap 32 to unscrew, and that accordingly, the cap 32 has been screwed onto the container sufficiently tightly.

However, in the case where the torque reading assembly 74 does not detect a resistance against the rotation of the cap engaging belts 111 and 112, or detects a resistance that does not approach the predetermined force value, the processing entity 76 will determine that the cap 32 has not been screwed onto the container 30 to the required minimum torque value. As such, in the case of an absence, or significant decrease in the resistance applied against the cap engaging belts 111 and 112, the container on which the cap 32 was screwed will be considered defective. This measurement of resistance against the cap engaging belts 111 and 112 can be measured either continually, or intermittently, as the cap 32 travels through the cap-engaging region 115.

The determination as to whether or not the cap 32 has been secured to the container to the minimum required torque value is performed by the processing entity 76. In accordance with a first embodiment, this determination is performed on the basis of the measurements received from the torque reading assembly 74. The determination may be performed by comparing one or more of the measurements received from the torque reading assembly 74 against the predetermined force value. If the one or more measurements is close to or reaches the predetermined force value, then the processing entity 76 will determine that the cap 32 has been secured onto the container to the minimum required torque value. The processing entity 76 may also analyze the change in resistance values as the cap 32 travels through the cap engaging region 115. For example, in the case where the cap 32 applied a strong resistance against the belts 111 and 112 at the beginning of the cap engaging region 115, and then suddenly the resistance applied to the belts 111 and 112 decreased dramatically, the processing entity 76 may also determine that the cap 32 became unscrewed while it was in the cap engaging region 115.

Alternatively, in accordance with a second non-limiting embodiment, the processing entity 76 may not even receive an actual force measurement from the torque reading assembly 74. Instead, the torque reading assembly 74 may simply provide the processing entity 76 with an indication as to whether or not the predetermined force value was achieved. In such a case, based on the indication from the torque measuring assembly, the processing entity 76 will determine whether the cap 32 has been sufficiently tightened onto the container.

It should be appreciated that the measurements of resistance that are obtained by the torque reading assembly 74 can be transferred to the processing entity 76 in real time, as they are being obtained by the torque reading assembly 74 or they can be sent to the processing entity 76 only periodically, or once the cap 32 has left the cap engaging region 115.

It should be appreciated that in this alternative embodiment, the torque measuring assembly 108 does not actually obtain a measurement of the torque that has been applied to the cap 32. Instead, the torque measuring assembly 108 simply obtains an indication as to whether or not a cap 32 has been torqued to above a predetermined minimum required torque value. The cap engaging belts 111 and 112 are calibrated such that if the cap 32 is tightened to below a predetermined torque range specified for that container, then the torque reading assembly 108 will cause the cap 32 to become unscrewed from the container 30, such that the container 30 and cap 32 are defective.

At step 106, the container 30 is caused to be handled, once released from the cap engaging assembly 72, on the basis of whether or not the cap 32 was determined to be defective.

As indicated above, this determination as to whether or not the cap is defective can be performed by the processing entity 76. More specifically, once the processing entity 76 has received the resistance values that have been obtained from the torque reading assembly 74, the processing entity 76 can determine from one or more of these values whether the cap 32 was unscrewed. For example, in the case where the torque reading assembly 74 initially measured a relatively high resistance against the cap engaging belts 111 and 112, and then the resistance dropped significantly, it can be assumed that the resistance drop is due to the fact that the cap was too loose and became unscrewed. Alternatively, in the case where the processing entity 76 received only one resistance measurement from the torque reading assembly 74 (namely the measurement that was taken just before the cap 32 left the cap engaging region 115) then that resistance value can be compared against a predetermined force value. In the case where the measured resistance value is less than the predetermined force value it can be determined that the cap was defective, or that the cap 32 was not screwed onto the container tightly enough.

In the case where it is determined that the cap 32 was not unscrewed, such that the level of torque to which the cap has been applied to the container is sufficient, then the container will be handled in a first manner once it has been released from the cap engaging assembly 72. For example, the container may be handled by simply letting it continue towards the next packaging station within the production line (which may be a labeling station, or a final boxing station).

In contrast, in the case where it is determined that the cap is too loose, or has been unscrewed in the torque measuring station 115, then the container will be handled in a different manner once it has been released from the cap engaging assembly 72. For example, the container may be caused to be rejected. In such a scenario, the container 30 will be removed from continuing along a production path for the containers. In an alternative example, when the cap 32 has not been screwed onto the container 30 tightly enough, the container may be caused to go through the cap screwing station 14 again, such that the cap 32 can be further tightened.

In accordance with a non-limiting embodiment, it is the processing entity 76 that causes the container 32 to be handled on the basis of the measurements received from the torque measuring assembly 108. For example, when the processing entity 76 determines that the cap has been unscrewed by the torque measuring station 110, then the processing entity 76 can issue a signal to a container rejection device for causing the container rejection device to remove the container from the production line. Alternatively, the processing entity 76 can issue a signal to an operator of the torque measuring assembly, via a display screen, for example, such that the operator can ensure that the container 30 and the cap 32 are handled in an appropriate way.

The manners in which the defective containers can be handled is described in more detail above with respect to the torque measuring assembly 50.

Although the present invention has been described in considerable detail with reference to certain preferred embodiments thereof, variations and refinements are possible without departing from the spirit of the invention. Therefore, the scope of the invention should be limited only by the appended claims and their equivalents.

What is claimed is:

1. A torque measuring station, comprising:

a) a cap-engaging assembly for engaging a cap that has been secured onto a container, the cap engaging assembly engaging the cap in a direction tending to screw the cap onto the container;

b) a torque reading assembly for obtaining a measurement from the cap-engaging assembly indicative of an application torque applied to the cap;

c) a processing entity in communication with said torque reading assembly for receiving said measurement indicative of the application torque, said processing entity causing the container to be handled, once released from said cap-engaging assembly, on the basis of said measurement indicative of the application torque applied to the cap.

2. A torque measuring station as defined in claim 1, wherein said processing entity is operative for determining whether said measurement indicative of the application torque, falls within a predetermined range, said container being handled, once released from said cap-engaging assembly, on the basis of whether said measurement indicative of the application torque falls within the predetermined range.

3. A torque measuring station as defined in claim 2, wherein said processing entity is operative for causing the container to be rejected when said measurement indicative of the application torque falls outside said predetermined range.

4. A torque measuring station as defined in claim 2, wherein said processing entity is in communication with a display unit, said processing entity being operative for causing said measurement indicative of the application torque to be displayed on said display unit.

5. A torque measuring station as defined in claim 4, wherein upon determination that said measurement indicative of the application torque falls outside of the predetermined range, said processing entity causing an indication that the container is defective to be displayed on the display unit.

6. A torque measuring station as defined in claim 1, wherein said cap-engaging assembly includes at least one belt.

7. A torque measuring station as defined in claim 1, wherein said torque reading assembly includes at least one torque sensing device.

8. A torque measuring station as defined in claim 1, wherein said processing entity is operative for storing in a memory unit measurements indicative of the application torque applied to caps of different containers.

9. A torque measuring station as defined in claim 8, wherein said processing entity is operative for generating statistics derived from said measurements indicative of the application torque applied to said caps of different containers.

10. A method, comprising:

a) engaging, at a cap-engaging assembly, a cap that has been secured onto a container in a direction tending to screw the cap onto the container;

b) obtaining a measurement indicative of an application torque applied to the cap;

c) causing the container to be handled, once released from the cap-engaging assembly, on the basis of the measurement indicative of the application torque applied to the cap.

11. A method as defined in claim 10, further comprising determining, at least in part on the basis of said measurement indicative of the application torque applied to the cap, whether said measurement indicative of the application torque falls within a predetermined range.

12. A method as defined in claim 11, further comprising causing the container to be handled, once released from said cap-engaging assembly, on the basis of whether said measurement indicative of the application torque falls within the predetermined range.

13. A method as defined in claim 12, further comprising causing the container to be rejected, once released from said cap-engaging assembly, when said measurement indicative of the application torque falls outside said predetermined range.

14. A method as defined in claim 10, wherein the cap-engaging assembly includes at least one belt.

15. A method as defined in claim 10, wherein the measurement indicative of the application torque applied to the cap is obtained from at least one torque sensing device.

16. A method as defined in claim 15, further comprising causing said measurement indicative of the application torque applied to the cap to be displayed on a display unit.

17. A method as defined in claim 10, wherein said measurement indicative of the application torque applied to the cap is stored in a memory unit.

18. A method as defined in claim 10, further comprising generating statistics derived from a plurality of measurements indicative of the application torque applied to subsequently engaged caps.

19. A torque measuring station, comprising:

a) a cap-engaging assembly for sequentially engaging caps that have been secured onto respective containers in a direction tending to screw the caps onto the containers;

b) a torque reading assembly operative for obtaining measurements indicative of the application torque applied to each of the sequentially engaged caps from said cap engaging assembly;

c) a processing entity in communication with said torque reading assembly for receiving the measurements indicative of the application torque applied to each of the sequentially engaged caps, said processing entity being operative for generating statistical data at least in part on the basis of the measurements indicative of the application torque applied to each of the sequentially engaged caps.

20. A torque measuring station as defined in claim 19, wherein said processing entity is further operative for determining, at least in part on the basis of the measurements indicative of the application torque applied to each of the sequentially engaged caps, whether each measurement falls within a predetermined range.

21. A torque measuring station as defined in claim 20, wherein said processing entity is further operative for causing a respective container to be handled, once it has been released from the cap-engaging assembly, on the basis of whether the measurement indicative of the application torque applied to a cap of the respective container falls within the predetermined range.

22. A torque measuring station as defined in claim 21, wherein said processing entity is operative for causing the container to be rejected when the measurement indicative of the application torque applied to the cap falls outside the predetermined range.

23. A torque measuring station as defined in claim 20, wherein the statistical data is representative of a number of caps whose caps have applied to respective containers to within a predetermined torque range.

24. A torque measuring station as defined in claim 20, wherein the statistical data is representative of a plurality of measurements obtained by the torque reading assembly.

25. A container capping system, comprising:

a) a cap applying station operative for engaging a cap positioned on a container, said cap applying station being operative for applying an application torque to the cap for securing the cap onto the container;

b) a torque measuring station located subsequent to said cap applying station, said torque measuring station being operative for engaging the cap in a direction tending to screw the cap onto the container, said torque measuring station being operative for determining whether the application torque applied to the cap has reached a predetermined torque value.

26. A container capping system as defined in claim 25, wherein the torque measuring station comprises a torque limiting device for limiting the torque applied to the cap when rotating the cap in a direction tending to screw the cap onto the container.

* * * * *